United States Patent
Filippov et al.

[11] 3,853,454
[45] Dec. 10, 1974

[54] METHOD AND APPARATUS FOR COMBUSTING FLAMMABLE LIQUID WASTES

[76] Inventors: Vladimir Ivanovich Filippov, ulitsa 8 Marta, 2/10, kv. 93, Moscow; Mikhail Vasilievich Sumarokov, ulitsa 116, korpus 26, kv. 38, Ljubertsy Moskovskoi oblasti, both of U.S.S.R.

[22] Filed: Dec. 29, 1972

[21] Appl. No.: 319,382

[30] Foreign Application Priority Data
Mar. 3, 1974  U.S.S.R............................ 1754724

[52] U.S. Cl...................... 431/7, 431/331, 110/7 R
[51] Int. Cl.............................................. F23d 5/02
[58] Field of Search ............ 110/7 A, 7 R; 431/7, 9, 431/173, 331, 335

[56] References Cited
UNITED STATES PATENTS

| | | | |
|---|---|---|---|
| 836,219 | 11/1906 | Schutz | 431/9 |
| 2,973,727 | 3/1961 | Northcote | 431/175 |
| 3,358,731 | 12/1967 | Donnelly | 431/7 |
| 3,671,167 | 6/1972 | Nakano | 110/7 R X |
| 3,748,081 | 7/1973 | Hummell | 110/7 R X |

Primary Examiner—William F. O'Dea
Assistant Examiner—William C. Anderson
Attorney, Agent, or Firm—Holman & Stern

[57] ABSTRACT

A method of combusting flammable liquid wastes, which consists in setting into rotation a layer of flammable liquid wastes in a circular space, while gasification products are set into rotation in a combustion chamber by way of feeding air on several horizontal planes and in several directions.

A plant for the combustion of flammable liquid wastes is arranged as a circular bath with a bubbling grate, above which there is a circular combustion chamber.

Air supply nozzles are in tiers along the perimeter of the combustion chamber on its inner and outer walls.

Nozzles for adjoining tiers are placed in opposite directions.

Said plant ensures an intensified process of gasification of burned wastes and, consequently, their intensive burning and the absence of smoke.

The plant allows flammable liquid wastes to burn with a water content of up to 60 percent and a mechanical impurities content of up to 10 percent.

5 Claims, 3 Drawing Figures

METHOD AND APPARATUS FOR COMBUSTING FLAMMABLE LIQUID WASTES

The herein proposed method relates to methods of combusting flammable liquid wastes, mainly of an organic nature, and in particular, those from industrial enterprises or in centralized waste disposal installations.

Liquid wastes are burned when, for some reason or other, they cannot be released into the sewer system dumped, or when their chemical treatment is too expensive.

As a rule, liquid wastes consist of flammable and non-flammable components and various suspended substances. As it is necessary to get rid of both the flammable and non-flammable liquid wastes, the highly flammable substances in liquid wastes are used for the combustion of their less flammable components and suspended substances.

The combustion of liquid wastes having a high content of flammable substances can be carried out in boiler plants provided with nozzles.

However, this method is impractical for highly polluted wastes having a high water content because of a possible clogging of the nozzle hole or a flame-out due to a crude dispersion of water.

The combustion of wastes in multiple-hearth and drum type furnaces is expensive and, as a result of underfiring, involves a release of large quantities of smoke polluting the atmosphere.

In the last few years, plants have been developed for the combustion of oil wastes in a fluidized bed. The adjustment of these plants has shown that the process is absolutely impossible without air preheating; by preheating of up to 400°C, the combustion proceeds in a wholly unsatisfactory manner, while further preheating is economically impractical.

As has been shown by modern practices in different countries, in a normal operation of a plant of this type, it is necessary to preheat the air up to no less than 450°C, and to introduce additional gas burners into the fluidized bed and to maintain its temperature at 700°-800°C, which makes the process highly expensive.

Also known in the art is a method of disposing of flammable liquid wastes by burning them in burners of the bubbling type.

This method is based on the interaction between an air-blown foaming layer of flammable liquid wastes and having a flame above it. The air blown into the layer of the flammable liquid wastes is referred to as primary. Upon breaking into bubbles, it produces a dynamically stable froth regime marked by a sharp increase in the interphase surface and intensified processes of mass and heat transfer in the layer.

The foaming is largely due to the boiling up of the water dispersed in the layer of flammable liquid wastes.

During the combustion process, part of the ruptured surface layers of the froth emerges as splash, while other parts are gasified, mixed with air and ignited in the combustion chamber.

Also another plant for the combustion of liquid fuel by way of bubbling part of the oxidizer, which is air, through a fuel layer is known in the art, which plant comprises a bubbling pipe having equidistant holes on its lower surface and placed in a bath which is filled with fuel up to a preset level. A cylindrical horizontal injection cup is mounted above the bath adjoining the port of the combustion chamber.

Nozzles are located above the bubbling bath for supplying secondary air to be directed upwards from the combustion surface and tangential to the body of the bath.

Practice has shown, however, that different versions of known plants for the combustion of flammable liquid wastes show substantial disadvantages of which the following should be mentioned: the throughput capacity of the plant being determined, among other factors, by the combustion surface area, it is difficult to ensure a uniform distribution of the secondary air above the combustion front in the bigger plants having a diameter of 2 to 3 m or more which results, as a rule, in a shortage of oxygen in central portion of the plant and, consequently, in an intensified smoke release; random bubbling effected in most cases through perforated pipes results in an uneven mixing of the layer, as some portions of it are mixed better than others, and, consequently, in the formation of stagnant zones having a low level of combustion of the process.

Besides, following the path of least resistance, the air tends to emerge from the upper rows of the bubbling holes which are disposed at different levels, due to which the lower holes either do not operate at all or do so in an unsatisfactory manner.

These factors reduce the throughput capacity of the plant, while random bubbling results in an ejection of drops from the burner which move upwards from the combustion surface and largely account for the chemical underfiring; an uneven distribution of secondary air over the combustion front makes it difficult to drive the emerging drops back into the layer, which results in an intensified release of smoke.

In the known plants, it is also difficult to ensure automatic cleaning of the bubbling bath of coke, ash and unburnt particles.

An object of the present invention is to overcome the foregoing disadvantages.

The invention aims at providing a method of combusting flammable liquid wastes employing a highly intensified process of the combustion of flammable liquid wastes and a device for effecting same.

According to the invention, this is attained by providing a method of combusting flammable liquid wastes, which consists in setting into rotation a layer of flammable liquid wastes by a directional and dispersed primary air flow, while the products resulting from the gasification of flammable liquid wastes are set into rotation in a combustion chamber by way of supplying air, at least in one plane perpendicular to the vertical axis of the combustion chamber, and along the entire perimeter of the chamber.

For effecting the proposed method, a plant has been developed for the combustion of flammable liquid wastes comprising a bath with a bubbling grate and, mounted above it, a combustion chamber with nozzles for feeding the secondary air; in accordance with the invention, the bath and the combustion chamber are circular, and the bubbling grate is provided with air ducts for setting glammable liquid wastes into rotation.

It is expedient that the secondary air supply nozzles be placed in tiers along the perimeter of the combustion chamber and on its inner and outer walls in such a way that the nozzles in one tier would set the gasification products into rotation in one direction, and those in an adjoining tier, in the opposite direction.

Besides, the combustion chamber nozzles, at least in one tier, are to be placed at an angle to those in another tier.

It is essential that the air ducts of the bubbling grate be placed in a direction opposite to that of the nearest nozzles of the combustion chamber.

The method of combusting flammable liquid wastes and the device for effecting same will now be explained in greater detail with reference to the accompanying drawings, wherein.

The novel method of combusting flammable liquid wastes consists in blowing air through a layer of flammable liquid wastes, which results in the formation of foam on the surface of the liquid. When the combustion starts, this process is substantially intensified by the boiling up of the water in the layer. The air for bubbling is supplied parallel to the layer which is set into rotation as it is thrust, from equidistant points, by the emerging air bubbles. The turbulent flow of the flammable liquid wastes washing the bubbling components ensures an intensive mixing and blending of the wastes at any point of the layer, effecting foam-breaking with the absence of stagnation zones where foam-breaking and the release of gases from the foam cells may be poor.

Upon leaving the layer of the flammable liquid wastes, the primary air tends to continue its tangential motion, while the drops resulting from the breaking of the foam cells instead of moving upwards from the bubbling surface, move along a complicated trajectory close to a spiral one, and are then broken up on contacting the secondary air flow, thus increasing the evaporation surface area. The unbroken drops return back into the layer.

The secondary air with the gasification products, are also set into rotation along a closed loop above the combustion surface in opposite directions and in parallel planes to the one above the other.

In the interface where the two layers of the gasification products are rotating in opposite directions, the relative speed of the motion is equal to the sum of the speeds of these flows.

Upon entering this zone, drops are intensively broken, this resulting in a sharp increase in the rate of evaporation and, hence, in an augmentation of the plant productivity. The complete combustion makes for the absence of smoke.

Moving along a closed loop and interchanging the direction of the rotation in the tiers, the gasification products are well mixed by the air and their journey to the combustion chamber becomes longer.

A change in the direction of the air flow causes the drops to break up, which does not allow them to separate on the walls of the chamber and also increases the surface area of the gasified liquid wastes.

Figure 1:
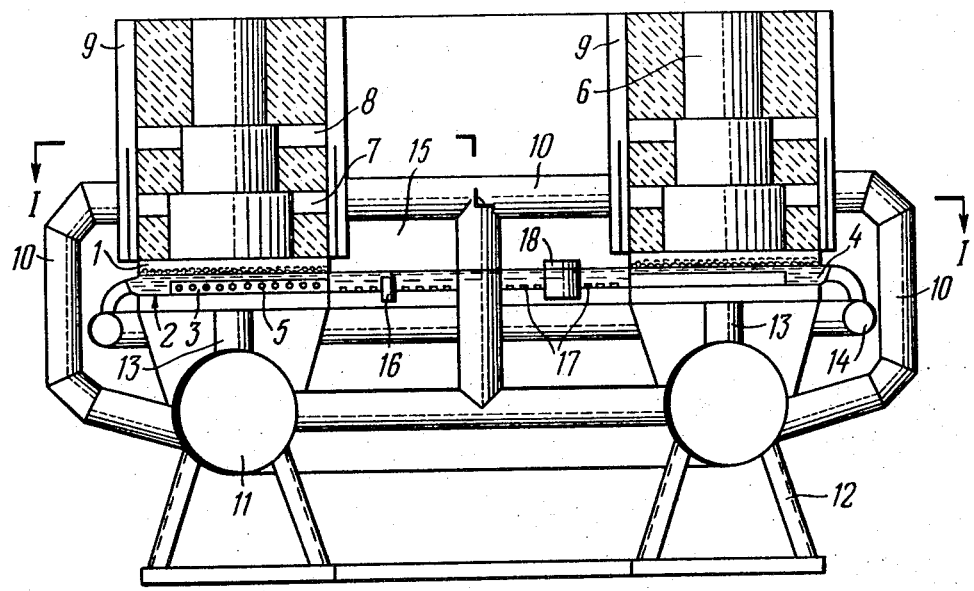
FIG. 1 represents a longitudinal section of the device for the combustion of flammable liquid wastes, in accordance with the invention.

The device for the combustion of flammable liquid wastes comprises a circular bubbling bath 1 (FIG. 1) with a bubbling grate 2 provided with air ducts 3 for setting flammable liquid wastes 4 into rotation.

The air ducts 3 have holes 5 for the release of air.

Figure 2:
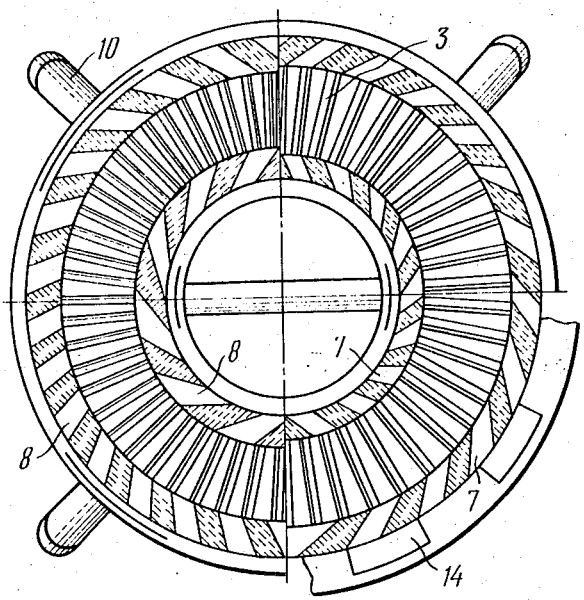
FIG. 2 represents a cross-section of FIG. 1 along the line I—I.

Placed above the bubbling bath 1 is a firebrick-lined circular combustion chamber 6; nozzles 7, 8 are placed along its perimeter on its inner and outer walls; these being located in tiers in the following way:

In the first tier, counting from the bubbling bath, the nozzles 7 (FIG. 2) are inserted in the body of the combustion chamber at an angle toward its walls, so that the air released through them rotates the gasification products in a direction opposite to that of the rotation of the liquid wastes layer. The nozzles 8 of the upper tier are placed at an angle toward the walls of the combustion chamber 6, thus ensuring its rotation in the opposite direction of the air released through them which, upon leaving the nozzles, turbulizes the gasification products. The nozzles 7, 8 (FIG. 1) of the first and second tiers are located in parallel horizontal planes.

The outer walls of the combustion chamber 6 are surrounded by air jackets 9 which, through which pipes 10, communicate along with a circular tubular manifold 11 which, in combination with supports 12, also serves as a frame for the device for the combustion of flammable liquid wastes. The manifold 11 communicates with the bubbling bath via branch pipes 13.

The air ducts 3 (FIG. 2) are placed radially, while their holes 5 are arranged in such a way that the air emerging through them sets the flammable liquid wastes into rotation. In order to control the primary and secondary air flows, the pipes are provided with swivel dampers or a gate (not shown in the drawing). Besides, the bath is provided with catching holes 14 to remove unburnt fractions of the wastes.

The supply of liquid wastes to a preheating chamber 15 (FIG. 1) is effected via a branch pipe 16. The fuel is supplied directly to the bubbling bath 1 via holes 17 in the inner cylindrical wall. A branch pipe 18 is to maintain a preset level for a layer of flammable liquid wastes in the plant and can be vertically adjusted.

Figure 3:
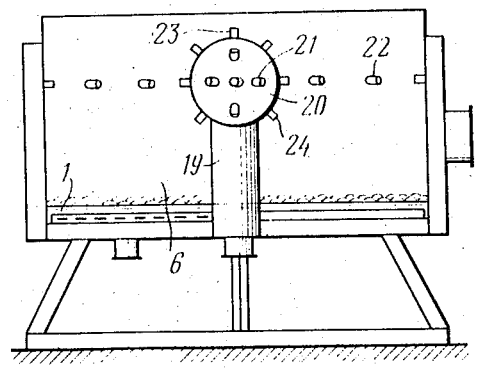
FIG. 3 represents an alternative version of the device for the combustion of flammable liquid wastes, according to the invention.

FIG. 3 shows an alternative version of the plant with a lower productivity and a diameter of the combustion chambers close to 2 m. In the center of the bubbling bath 1 is a column 19 made as a pipe placed in the center of the bath 1 and provided with a nozzle head 20, nozzles 21 and in the center thereof and being placed at the level of tangential nozzles 22 of the combustion chamber and adjusted in such a way so that the direction of the air coming through them coincides with the air coming through the nozzles 22 in the walls of the combustion chamber.

Besides the nozzles 21, there are two more rows of nozzles 23 and 24 in the middle of the head 20 there, above and below the middle tier, which are placed at an angle to the horizontal plane. This position of the nozzles 23 and 24 makes for a greater vorticity of the gasification products and a more effective ejection of the spray of the flammable wastes formed as a result of the foam breaking into the bubbled layer. In the present embodiment, the head 20 is spherical in shape, but it can also be cylindrical, cylinder-cone, etc.

The plant for the combustion of flammable liquid wastes operates as follows.

Flammable liquid wastes are supplied via the branch pipe 14 to the circular bubbling bath 1 where they are heated by the heat radiated from the walls of the plant.

As a result of the warming-up process, the wastes lose some of their viscosity and flow into the bubbling bath 1 through the holes 17 in the wall of the body. From the circular air manifold 11, via the branch pipes 13, primary air is fed through the air ducts 3 into the layer of flammable liquid wastes and sets it into rotation due to the fact that the holes 5 in the air ducts 3 are directed to one side. The height of the layer level is set by the pressure of a fan (not shown in the drawing) blowing air into the manifold 11.

Medium-pressure fans are the most economical for the air supply in the given plant and the height of the layer should not exceed 150–200 mm.

As a result of the warming-up by the torch above the layer, the emulsified water in the wastes layer boils up; the quantity of this water may contain up to 60 percent of the flammable component. This results in the formation of a foam layer intensified by the air blowing. The rate of the formation and the breaking of foam cells into which the flammable substance evaporates, largely accounts for the productivity of the plant. In the course of turbulent rotation, the wastes are well blended and mixed, and the foam layer is destroyed and restored without the formation of stagnant zones featuring a low intensity of gasification.

Upon leaving the layer, the primary air tends to continue its rotation, and entraining drops and sprays resulting from the breaking of the foam. Upon encountering the secondary air flow moving in the opposite direction, these drops and sprays are intensively broken and caused to evaporate due to the high temperature of the torch. The non-evaporated, but well heated particles return to the bubbling bath, intensifying the heat exchange in the flammable wastes layer. The probability of an ejection of drops from the combustion chamber is already reduced at the moment of their formation.

The secondary air which is necessary for the combustion reaction is supplied from the annular manifold 11, via the pipes 10, into the air jacket 9, wherefrom it is fed into the combustion chamber 6 in tiers through the equidistant nozzles 7 and 8.

As a result of the rotation and the changed direction of the motion from tier to tier, the gasification products are intensively mixed with the air, while the sprays of the wastes due to the breaking of the foam are intensively broken, thus increasing the total evaporation surface area and reducing the formation of smoke due to the complete combustion.

As a rule, the flammable wastes contain 5–10 percent of a solid phase having a high ash content. In the course of the operation, part of the ash is released with smoke gases, while the biggest particles of ash, sand and coke are gradually collected in the bubbling bath 1, which deteriorates the bubbling conditions.

Hence, the plant needs a cleaning cycle.

Unlike the known devices of this type where the cleaning is performed manually, in this novel plant cleaning is effected as follows.

The supply of liquid wastes is stopped for a few minutes, and their layer burnt up; the ash and coke rotating under the thrust of the primary air, are thrown by centrifugal force to the periphery of the bath 1 and fall into the removable catchers 14 which communicate with the bubbling bath via branch pipes and are periodically withdrawn. Liquid wastes are fed again into the still hot burner, and the process continues. Instead of taking several hours, during which time the bath must cool down enough so that it is possible to collect ash and coke by hand, the cleaning process of present device only takes a few minutes and is only retarded by the time necessary to burn out the layer. A simple device like a time relay adjustable depending on the nature of the wastes may complete the automation of the plant cleaning.

The plant described hereinabove allows oil wastes to burn having a water content of up to 60 percent without their preliminary thorough homogenizing.

The plant allows wastes containing up to 10 percent of mechanical impurities to burn, and in some cases even more, while ash content may amount to 70 percent.

The plant design makes it possible to completely automate the process, including the cleaning, and rules out the necessity of a repeated kindling.

Air samples taken at different distances from the plant meet the permissible standards.

The plant does not need a high chimney stack, nor a complex cyclone or scrubber cleaning devices; a 2 to 4 m high flare with tier slots for the air intake ensures a substantial lowering of the temperature of the released gases.

The purification of the air from dust-like particles can be attained by placing the plant in a closed pavillion having a mesh roof (not shown in the drawing). The diameter of the mesh has to be some 10 $\mu$. The rotation of the flame contributes to the separation of particles due to the centrifugal force.

The heat produced by plants of this type can be utilized, for example, by their being placed under hot-water boilers (not shown in the drawing).

The plant does not need air compressors or blowers for its normal air supply, as it is sufficient to use fans having a head of 150–170 mm $H_2O$.

The burner is manufactured from ordinary carbon steel; the upper section of the combustion chamber may be faced with fireclay brick.

The walls and the bottom of the circular bath and the bubbling members are made of carbon steel and do not need special protection. While in operation, they are intensively sprayed and cooled by the burning liquid whose temperature is determined by the boiling temperature of the water in it, i.e. it is close to 100°C. Smaller burners can be made of pig iron, without brick-facing.

It is practical to burn the following flammable wastes in plants of the foregoing type:

wastes taken from the surface of settling tanks of sewer systems;

wastes from the electrical industry;

automobile industry wastes;

aviation industry wastes and;

wastes collected in water bodies.

The combustion practically rules out smoke releases; the optimum productivity amounts to 1 $m^3$ of wastes per $m^2$ of the circular bath surface.

A floating version of the plant is also possible, without any substantial modifications, which ensures an influx of fuel without its being force pumped. This version is recommended, for example, for cleaning water port areas.

What is claimed is:

1. A method of combusting flammable liquid wastes, comprising setting a layer of flammable liquid wastes into rotation in a circular space by way of a directional and dispersed air flow through this layer, while the gasification products of the flammable liquid wastes arise and are set into rotation in a combustion chamber by supplying air thereto on, at least one plane perpendicular to the vertical axis of the combustion chamber, and along the entire perimeter of the chamber.

2. A plant for the combustion of flammable liquid wastes comprising a circular bath containing a layer of flammable liquid wastes; a bubbling grate placed in said circular bath; air ducts means of said bubbling grate being arranged in such a way that the air passing through them sets the flammable liquid wastes into rotation; a combustion chamber arranged above the circular bath; nozzles for supplying air into said combustion chamber and arranged in tiers along the perimeter of said combustion chamber on its inner and outer walls; and means for supplying air into said bubbling grate and to said nozzles of the combustion chamber.

3. A plant as claimed in claim 2, wherein said nozzles in tiers are placed in such a way that the air coming through them rotates the gasification products in one tier in one direction, and in an adjoining tier, in the opposite direction.

4. A plant as claimed in claim 2, wherein said nozzles are placed, at least in one tier, at an angle to that of said nozzles of another tier.

5. A plant as claimed in claim 2, wherein said air ducts means of the bubbling grate are arranged in the bottom of the circular bath and are directed so that the air coming out of them is rotated in one direction, the nozzles of the first tier in the combustion chamber counting from the bottom being directed so that the flow of air coming out of them is directed opposite to the direction of the air flow coming out of the air ducts means of the bubbling grate.

* * * * *